United States Patent
Sharma et al.

(10) Patent No.: US 12,425,901 B2
(45) Date of Patent: Sep. 23, 2025

(54) COMMUNICATIONS DEVICE, INFRASTRUCTURE EQUIPMENT, CORE NETWORK ELEMENT AND METHODS FOR MINIMIZATION OF DRIVE TESTS, MDT, REPORT

(71) Applicant: Sony Group Corporation, Tokyo (JP)

(72) Inventors: Vivek Sharma, Basingstoke (GB); Yuxin Wei, Basingstoke (GB); Hideji Wakabayashi, Basingstoke (GB); Yassin Aden Awad, Basingstoke (GB)

(73) Assignee: SONY GROUP CORPORATION, Tokyo (JP)

(*) Notice: Subject to any disclaimer, the term of this patent is extended or adjusted under 35 U.S.C. 154(b) by 371 days.

(21) Appl. No.: 17/789,808

(22) PCT Filed: Jan. 6, 2021

(86) PCT No.: PCT/EP2021/050138
§ 371 (c)(1),
(2) Date: Jun. 29, 2022

(87) PCT Pub. No.: WO2021/140127
PCT Pub. Date: Jul. 15, 2021

(65) Prior Publication Data
US 2023/0045440 A1    Feb. 9, 2023

(30) Foreign Application Priority Data
Jan. 9, 2020   (EP) .................................... 20151058

(51) Int. Cl.
*H04W 24/10*    (2009.01)
*H04W 24/08*    (2009.01)
*H04W 48/02*    (2009.01)

(52) U.S. Cl.
CPC .......... *H04W 24/10* (2013.01); *H04W 24/08* (2013.01); *H04W 48/02* (2013.01)

(58) Field of Classification Search
CPC ..... H04W 24/10; H04W 24/08; H04W 48/02; H04W 48/12; H04W 24/02; H04W 88/06
See application file for complete search history.

(56) References Cited

U.S. PATENT DOCUMENTS

| | | | |
|---|---|---|---|
| 2011/0183662 A1* | 7/2011 | Lee | H04W 36/0005 455/422.1 |
| 2011/0201279 A1* | 8/2011 | Suzuki | H04W 24/10 455/67.11 |

(Continued)

FOREIGN PATENT DOCUMENTS

| | | |
|---|---|---|
| CN | 102884830 A | 1/2013 |
| CN | 103155629 A | 6/2013 |
| CN | 108566682 A | 9/2018 |
| EP | 2768254 A1 | 8/2014 |
| WO | WO-2012043796 A1 | 4/2012 |

(Continued)

OTHER PUBLICATIONS

International Search Report and Written Opinion mailed on Apr. 13, 2021, received for PCT Application PCT/EP2021/050138, filed on Jan. 6, 2021, 11 pages.

(Continued)

*Primary Examiner* — Tejis Daya
(74) *Attorney, Agent, or Firm* — XSENSUS, LLP

(57) ABSTRACT

A method of operating a communications device in a wireless communications network, the method comprising: measuring received signals transmitted in a first cell at a first location to generate a measurement result, wherein the communications device is not permitted to access the first cell, and transmitting in a second cell a minimization of drive tests (MDT) report based on the measurement result, the report comprising an indication of the first location.

20 Claims, 7 Drawing Sheets

(56) References Cited

U.S. PATENT DOCUMENTS

| | | | |
|---|---|---|---|
| 2011/0306345 A1* | 12/2011 | Wu | H04W 24/08 455/466 |
| 2013/0021940 A1* | 1/2013 | Keskitalo | H04W 36/0088 370/252 |
| 2013/0045735 A1* | 2/2013 | Kim | H04W 24/10 455/422.1 |
| 2013/0053033 A1* | 2/2013 | Jokinen | H04W 36/0061 455/436 |
| 2017/0188256 A1* | 6/2017 | Wang | H04W 4/90 |
| 2021/0014718 A1* | 1/2021 | Li | H04W 24/08 |
| 2021/0100062 A1* | 4/2021 | Joseph | H04W 76/27 |
| 2022/0132626 A1* | 4/2022 | Xu | H04W 76/11 |
| 2023/0106995 A1* | 4/2023 | Li | H04W 36/0058 455/436 |

FOREIGN PATENT DOCUMENTS

| | | |
|---|---|---|
| WO | 2013/051834 A1 | 4/2013 |
| WO | WO-2017037845 A1 | 3/2017 |

OTHER PUBLICATIONS

3GPP, "System Architecture for the 5G System (5GS); Stage 2 (Release 16)", 3GPP TS 23.501 V16.2.0, Sep. 2019, pp. 1-391.

3GPP, "NR; NR and NG-RAN Overall Description; Stage 2 (Release 15)", 3GPP TS 38.300 V15.7.0, Sep. 2019, pp. 1-99.

3GPP, "NR; User Equipment (UE) procedures in Idle mode and RRC Inactive state (Release 15)", 3GPP TS 38.304 V15.5.0, Sep. 2019, pp. 1-29.

Holma et al., "LTE for UMTS OFDMA and SC-FDMA Based Radio Access", John Wiley & Sons, 2009, 232 pages.

Alcatel-Lucent, "Idle Mode Logged MDT reporting mechanism", 3GPP TSG-RAN WG2 Meeting #69bis, R2-102056, Apr. 12-16, 2010, 4 pages.

ETSI MCC "Report of 3GPP TSG RAN2#108 meeting, Reno, USA" , 3GPP Draft; Draft Ran2#108 Report V2, 3rd Generation Partnership Project (3GPP), Mobile Competence Centre ; 650, Route Des Lucioles ; F-06921 Sophia-Antipolis Cedex, Nov. 18-22, 2019, pp. 1-320.

Nokia et al., "Revised SID: Study on NR Industrial Internet of Things (IoT)", 3GPP TSG RAN meeting #81, RP-182090, Sep. 10-13, 2018, 5 pages.

Alcatel-Lucent, "Idle mode logged MDT reporting mechanism", 3GPP TSG-RAN WG2 Meeting #69bis, Apr. 12-16, 2010, 4 pgs, R2-102056.

Sony, "Cell selection/reselection with NPN cells", 3GPP TSG RAN WG2 #107, R2-1909912, Aug. 26-30, 2019, 4pgs.

Sony, Cell selection/reselection with NPN cells, 3GPP TSG RAN WG2 #108 R2-1915236, Nov. 18-22, 2019, 5 pgs.

* cited by examiner

COMMUNICATIONS DEVICE, INFRASTRUCTURE EQUIPMENT, CORE NETWORK ELEMENT AND METHODS FOR MINIMIZATION OF DRIVE TESTS, MDT, REPORT

BACKGROUND

Cross-Reference to Related Applications

This application is based on PCT filing PCT/EP2021/050138, filed Jan. 6, 2021, which claims the priority of European Patent Application EP 20151058.3, filed Jan. 9, 2020, the contents of each of which are hereby incorporated by reference in their entirety.

FIELD

The present disclosure relates to communications devices, infrastructure equipment and methods of reporting measurements of a restricted access cell by a communications device in a wireless communications network.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected that future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new Radio Access Technology (RAT) systems [1], as well as future iterations/releases of existing systems, to efficiently support connectivity for a wide range of devices associated with different applications and different characteristic data traffic profiles.

One aspect which may be considered for wireless communications networks and communications devices for 5G/NR technology is an arrangement in which the wireless communications network is divided into a public network part and a non-public network part. Access of the communications devices to the non-public network part may be restricted to certain types of communications devices or to a controlled group of communications devices. A technical challenge therefore arises in managing networks comprising non-public network parts, particularly when their geographical coverage overlaps with that of other networks, including public networks.

SUMMARY

The present disclosure can help address or mitigate at least some of the issues discussed above.

Embodiments of the present technique can provide a method of operating a communications device in a wireless communications network, the method comprising measuring received signals transmitted in a first cell at a first location to generate a measurement result, wherein the communications device is not permitted to access the first cell, and transmitting in a second cell a minimization of drive tests (MDT) report based on the measurement result, the report comprising an indication of the first location. According to example embodiments, the communications device is still arranged to report on cells to which it has been configured not to access (receive and measure signals or cannot attach but can measure signals). Example embodiments can find application with drive tests.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
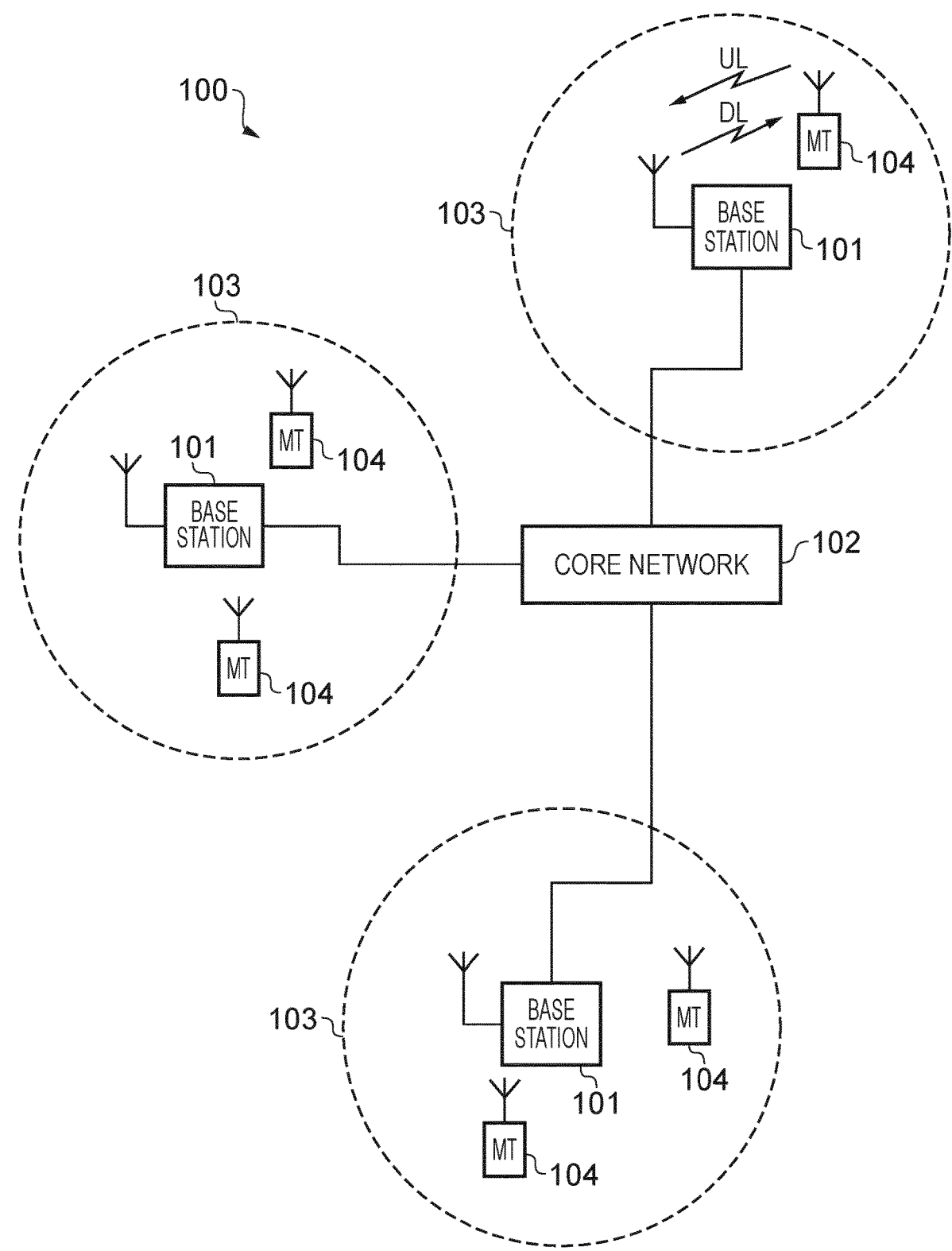
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
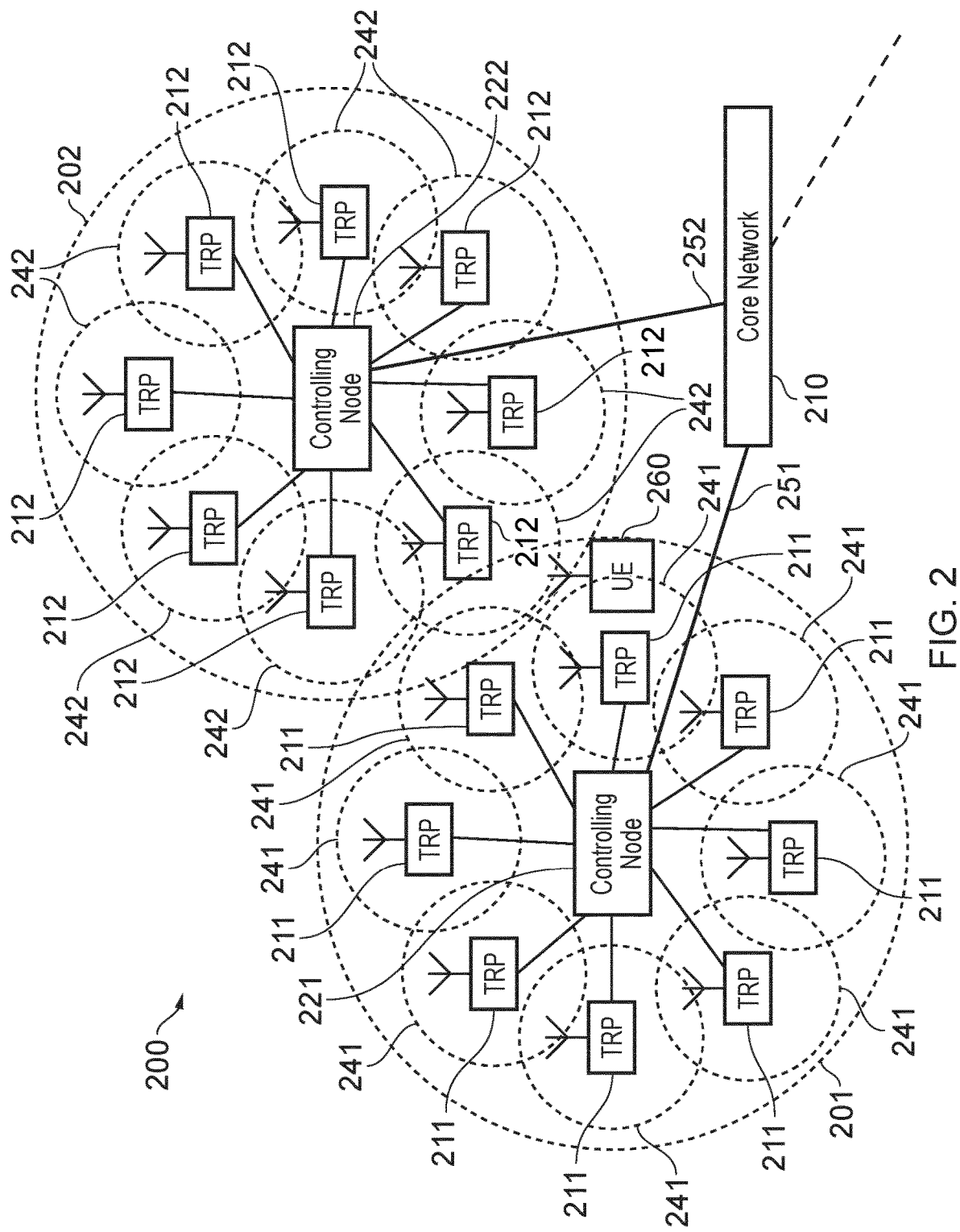
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a 5G or New Radio (NR) wireless communications network/system 200 based on previously proposed approaches which may also be adapted to provide functionality in accordance with embodiments of the disclosure described herein. The NR network 200 represented in FIG. 2 comprises a first communication cell 201 and a second communication cell 202. Each communications cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell 201 via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for an NR communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
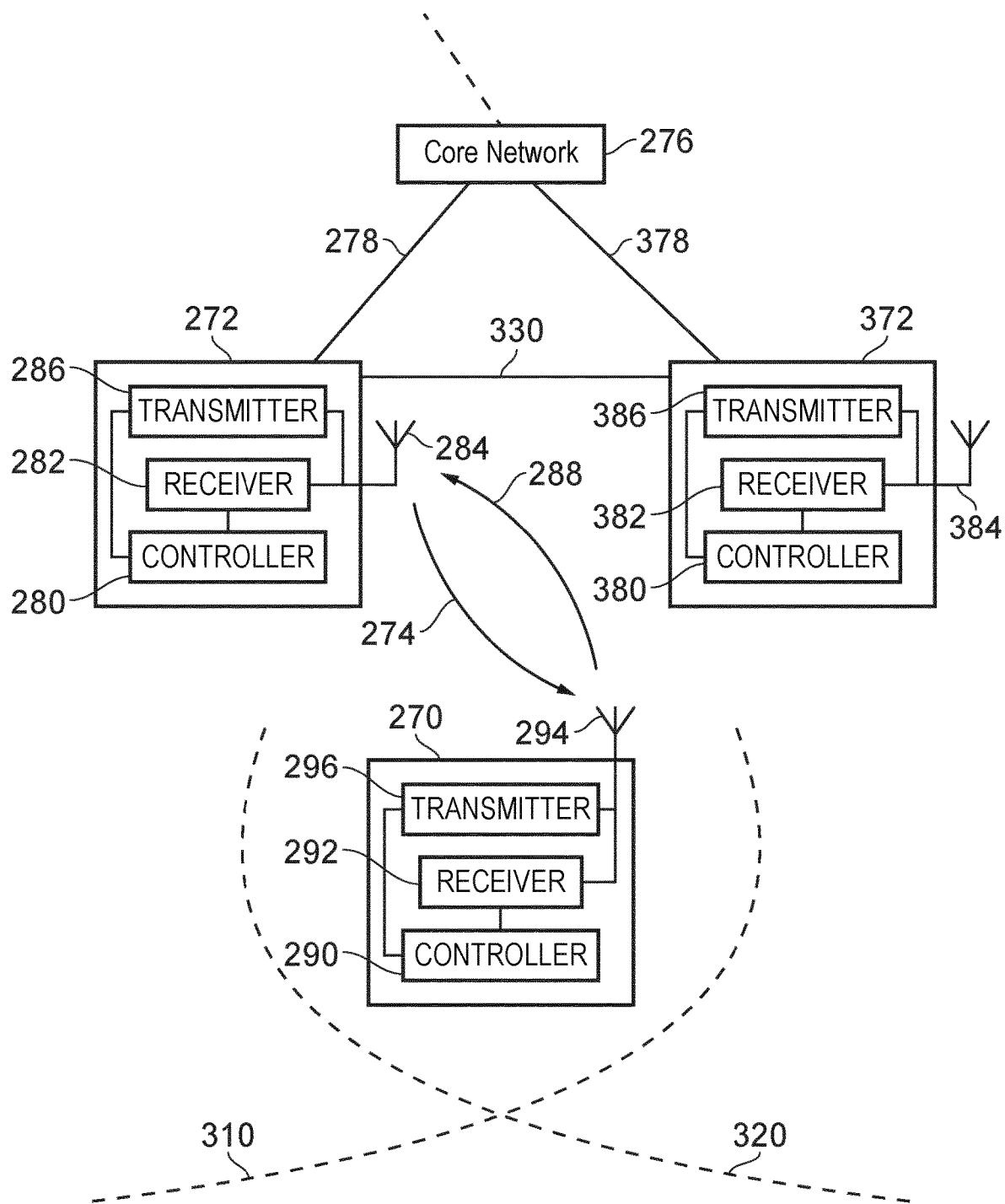
FIG. 3 is a schematic block diagram of example infrastructure equipment and communications device which may be configured in accordance with certain embodiments.

FIG. 3 illustrates schematically a UE/communications device 270 and example first and second network infrastructure equipment 272, 372. The communications device 270 may be thought of as an example of the communications device 104 of FIG. 1 or of the UE 260 of FIG. 2. Each of the first and second infrastructure equipment 272, 372, may be thought of as a gNB 101 or a combination of a controlling node 221 and associated TRP(s) 211. Controllers 280, 380 of the infrastructure equipment 272, 372 are connected to a core network part 276 via respective interfaces 278, 378.

The first infrastructure equipment 272 includes a receiver 282 connected to an antenna 284 and a transmitter 286 connected to the antenna 284. Similarly, the second infrastructure equipment 372 includes a receiver 382 connected to an antenna 384 and a transmitter 386 connected to the antenna 384.

The controllers 280, 380 are configured to control the first and second infrastructure equipment 272, 372 respectively and may comprise processor circuitry which may in turn comprise various sub-units/sub-circuits for providing functionality as explained further herein. These sub-units may be implemented as discrete hardware elements or as appropriately configured functions of the processor circuitry. Thus the controllers 280, 380 may comprise circuitry which is suitably configured/programmed to provide the desired functionality using conventional programming/configuration techniques for equipment in wireless telecommunications systems. The transmitters 286, 386 and the receivers 282, 382 may comprise signal processing and radio frequency filters, amplifiers and circuitry in accordance with conventional arrangements. The transmitters 286, 386, the receivers 282, 382 and the controllers 280, 380 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272, 372 will in general comprise various other elements associated with its operating functionality.

Correspondingly, the UE 270 includes a controller 290 connected to a receiver 292 which receives signals from an antenna 294 and a transmitter 296 also connected to the antenna 294.

The controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 380, 290 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

The first and second infrastructure equipment 272, 372 are connected directly to each other via an inter-infrastructure equipment interface 330, which, for example, may be operated broadly in accordance with conventional specifications for an X2 or Xn interface as specified by 3GPP.

The first infrastructure equipment 272 controls a first cell 310 in which the communications device 270 receives downlink data from the first infrastructure equipment 272 via resources of a wireless access interface as illustrated generally by an arrow 274, and transmits uplink data to the first infrastructure equipment 272 via resources of the wireless access interface as illustrated generally by an arrow 288.

The second infrastructure equipment 372 controls a second cell 320, which forms a part of a non public network, as will now be described.

Blacklisted and Non Public Networks

Conventionally, a goal of operators of wireless communications networks has been to provide greatest geographical coverage and/or maximum performance for all its customers, while minimising expenditure on infrastructure equipment. Accordingly, it is generally preferable that each communications device using a wireless communications network obtains service in the most appropriate cell of those available. Restrictions by which a communications device is barred from selecting a particular cell have been rarely used, other than for testing and/or other temporary operational reasons.

However, there has emerged a requirement to restrict certain cells to certain subscribers/communications devices. For example, an organisation may enter into an agreement with an operator of an existing wireless communications network, whereby the wireless communications network operator extends an existing network by deploying infrastructure equipment to generate new cells covering the organisation's premises. These cells may be restricted to communications devices associated with employees and/or equipment belonging to that organisation. These cells may be referred to as a 'non public network' (NPN), and access restrictions may apply to all communications devices, such that all communications device are permitted to access NPN cells only if they have the required permission(s).

As a result of such an arrangement, the organisation may ensure that communications devices under its control have good coverage and/or good performance in a particular area. In particular, the NPN cells may cover indoor and/or underground spaces where conventional coverage is weak or non-existent.

Non Public Networks (NPN) are therefore networks which are deployed outside of a traditional mobile operator network. There are two deployment options:

NPN deployed as a Standalone Non Public Network (SNPN), and

NPN deployed as part of an operator's network.

Where the cells form part of a network having a public network (PN) portion, they may be referred to as a non-standalone NPN (NSNPN) or public network integrated (PNI) NPN. In such scenarios, for example, for the NPN cells may be generated by infrastructure equipment which also generates cells for the PN portion, or the infrastructure equipment may be connected to a common core network.

When a NPN is hosted by a public network (PNI NPN), the NPN could be implemented by realizing a dedicated network slice or APN (Access Point Name) for the NPN. A network slice may comprise a logical portion of the wireless communications network that can operate to a certain extent independently of other network slices, while sharing at least some physical equipment and/or communications links. For example, a first network slice may be associated with a first service provider, and a second network slice may be associated with a second service provider. Each service provider may operate, for example, authentication and billing functions independently of each other; nevertheless, both network slices may use a common radio access network and/or common core network equipment. A network slice may be as defined in [3].

For PNI NPN, cells may be associated with one or more closed access group (CAG) IDs, which may be transmitted in broadcast system information (e.g. System information block, SIB, 1). An NPN identifier (ID) may also be transmitted in system information of a PNI NPN cell. [4] [5]

Alternatively, infrastructure equipment and corresponding NPN cells may form a 'standalone' network, separate from an existing or public network. Such a standalone network may be referred to as a 'standalone non public network (SNPN).

An SNPN may be assigned an identifier similar to a PLMN ID and/or an NPN identifier (NPN ID). These identifiers may be broadcast, for example in system information of SNPN cells.

A communications device may be configured with, or provisioned with, a list of identifiers associated with NPN cells. The communications device may thus determine whether it is permitted to access an NPN cell by comparing the identifier(s) broadcast in the cell with its configured list of identifiers. If a match is found, then the communications device may access the cell.

In addition, or alternatively, a communications device may be provisioned or configured to be permitted to access i) only NPN cells or ii) only non-NPN cells. For example, a communications device which is permitted access to at least some NPN cells (i.e. are configured with one or more allowed CAG IDs) may or may not be permitted to access cells which are not NPN cells. If a communications device is configured with permission to access only cells associated with one or more specific CAG IDs, then it will consider any cell which is not an NPN cell as not valid as a serving cell.

Similarly, a communications device may be configured to operate in a mode where it selects only an SNPN (see [3], section 5.30.2).

On the other hand, an NPN subscription may permit a UE to register and obtain service via a public network (PN) network as well.

As described above, identifiers associated with NPN cells may be transmitted in system information. A communications device must therefore receive and decode the signals carrying the system information in order to determine whether the communications device is permitted to access the cell.

To avoid this, a communications device may receive an indication of one or more physical cell identities (PCI) which are associated with cell(s) which the communications device is not permitted to access. The PCI of a cell can be determined prior to decoding the system information. Accordingly, power consumption and latency associated with determining that a cell is not accessible can be reduced. The PCI indication may also comprise an indication of cells which are not allowed for other reasons (e.g. are 'blacklisted' cells).

A communications device may receive an indication of one or more PCIs associated with a certain type of NPN cell, e.g. an SNPN PCI indication, indicating the PCI value(s) associated with the one or more SNPN cells. If the communications device is not permitted to access any SNPN cell, then it can determine based on the SNPN PCI indication and the PCI of a cell whether it is not permitted to access that cell because it is an SNPN cell. As an alternative or in addition, the communications device may receive an indication of a range of PCI values. The range of PCI values may be associated with a CAG IDs or these may be an SNPN range.

LTE and CSG Cells

In 4G/LTE, closed subscriber group (CSG) functionality has been specified, whereby a communications device can be associated with one or more allowed CSG IDs. Access to a cell may be restricted to those communications devices associated with (i.e. having in an allowed list) a CSG ID associated with the cell.

In 4G/LTE, a wireless communications network may comprise CSG cells, which are cells not accessible to communications devices not having any allowed CSG IDs, and non-CSG cells, which are cells having no restriction. A sub-class of CSG cells is known as hybrid cells. These cells may be accessed by certain communications devices according to the rules for non-CSG cells, and by certain other communications devices according to the rules for CSG cells. As such, access restrictions do not apply to communications devices which access the cell according to the rules for non-CSG cells.

LTE CSG cells, and 5G/NR NPN cells are thus examples of cells which a communications device may be prohibited from accessing (i.e. cells which the communications device may not be permitted to access).

Embodiments of the present technique may apply to all such cells. In some embodiments, the techniques disclosed herein are applicable only to a certain class of cells. Examples of such classes may include 5G/NR NPN cells, 5G/NR SNPN cells, and 5G/NR PNI-NPN cells. However it will be appreciated that these are just examples of black listed cells, which may also be applied for LTE/4G as well as 5G. For example, SNSP may be introduced for LTE and CAG and CSG may be deploy in a network whether LTE or 5G/NR.

Minimisation of Drive Tests (MDT)

Figure 4:
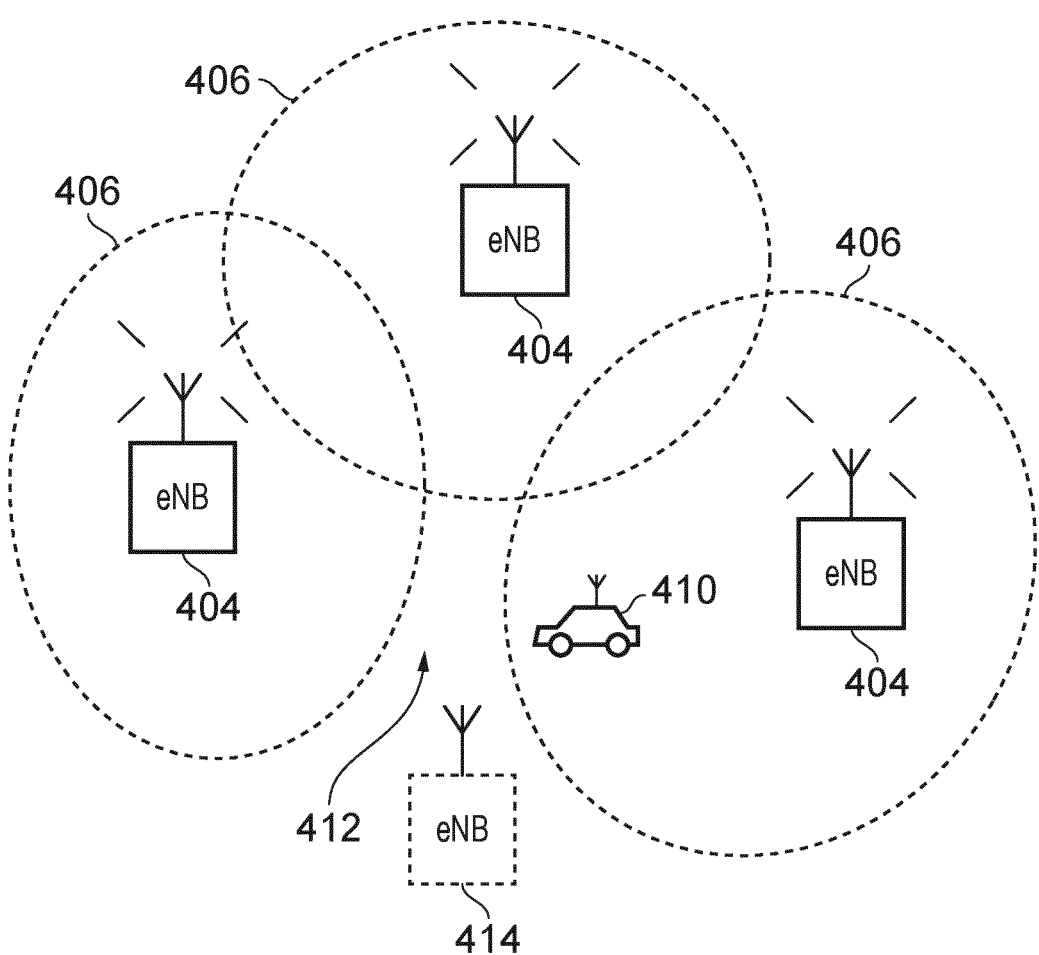
FIG. 4 provides a schematic illustration of a mobile radio network in which a conventional minimization of drive tests (MDT) procedure may be carried out.

Those familiar with the deployment of radio mobile networks will appreciate that an operator spends a considerable amount of resources in deploying a network and seeks to recover the deployment costs by charging for mobile voice and/or data services to users of the network. As will be appreciated the revenue generated from a mobile radio network is therefore directly related to an extent and quality of radio coverage which is provided by that mobile radio network. If there is a break (or even drop in quality) in coverage then there will be a corresponding loss of revenue or indeed a reduction in service quality to the users as a result of call dropping or loss of data etc. Accordingly it has been established to conduct so called "drive tests" where a communications device with receiving and transmitting equipment is arranged to detect signals received from base stations of the mobile network and/or to transmit signals to the mobile radio network in order to identify locations where there is a discontinuity or lower quality in the coverage provided by the mobile radio network. FIG. 4 provides a schematic illustration of a mobile radio network comprising three base stations 404 for which a radio coverage area provided by each base station is illustrated by a dotted line 406. As shown in FIG. 4 a vehicle 410 comprising or carrying a communications device is shown which drives around a geographical area provided by the base stations 404. As can be seen by a gap in the dotted lines 406 there is an area 412, which represents a gap in coverage. Accordingly, by identifying the gap 412 in coverage either directional antennas of the base stations 404 can be used to fill in the gap 412 or a further base station 414 can be deployed in order to provide coverage area to the gap.

As will be appreciated, performing drive tests represents a significant cost to the operator of a mobile communications network. Accordingly, it has been proposed for some telecommunications systems such as 3GPP to reduce the need for drive tests by providing an arrangement in which conventional UEs (i.e. those owned and/or operated by subscribers) are used to report measurements of signal strengths of received signals from base stations of the network to minimise the measurements performed during a drive test. Such a technique is referred to as minimisation of drive tests (MDT) and for example has been specified within 3GPP TS 37.320 and is provided in a report 3GPP TR 36.805. Network signalling and an overall architecture for MDT is disclosed in 3GPP T532.422.

One problem which can be addressed by MDT is the identification of regions where coverage (e.g. received downlink signal strength) is available, but is subject to excessive interference from transmissions in other cells. To facilitate this, MDT reports may comprise an indication of signal to interference and noise (SINR) or similar metrics (RSRQ), as measured by a UE.

In general, MDT can enable an operator to measure the effectiveness of a current network configuration more cost-effectively. Here, the 'configuration' may refer not only to the location and design of network infrastructure equipment, such as antennas, base stations and so on, but the operation of the network and, to the extent it can be configurable by the network, the operation of UEs within the network.

For example, adapting the configuration may comprise one or more of deploying additional cells, changing the frequencies or frequency bands used for transmissions (uplink and/or downlink) in a cell, and modifying downlink power, UE cell reselection thresholds, or UE handover measurement thresholds.

In general MDT is not intended to be performed by a single UE. A radio access network such as an 4G/LTE (Evolved Universal Terrestrial Radio Access Network, EUTRAN) may activate many UEs in an area to perform measurements, and the measurements would then be collected and analysed by the operator to provide a more complete view of the system operation. As such, MDT is an attractive feature for operators since it can enable significant cost savings when deploying new networks or new features in the existing deployments and this has been reflected by the continued support and enhancement of the feature in 3GPP.

In the context of some radio access network MDT schemes, (including in 3GPP LTE from 3GPP Release 10), there are two basic forms of MDT: Immediate MDT and Logged MDT.

Immediate MDT defines a functionality for measurements performed by the UE in a CONNECTED state. The measurements are reported to an infrastructure equipment which is available when the UE is in the connected state. Typically these measurements use measurement control/report functionality in order for the network to request specific measurements from UEs while in connected mode. The measurement control/report functionality may be substantially similar to that used for the measurements of cells for the purposes of determining whether a handover should occur and/or for evaluating potential candidate target cells for a handover of the UE. The UE can also be requested to provide location information, such as global navigation satellite system (GNSS) location data, or radio frequency (RF) measurements in order to estimate a location based on a RF 'fingerprint'.

Logged MDT refers to an arrangement involving measurement logging by UE in states other than a connected state. For example, the UE may collect measurements which are being performed as part of normal idle mode procedures (such as cell selection/reselection) and store them in a log along with location information. The logged measurement and location information may be reported to the network at a later time, e.g. upon request, when in connected mode.

MDT for 3GPP 5G/NR networks is not yet defined, but is expected to operate along similar principles as MDT for LTE Release 10.

Self-organizing networks (SON) rely on similar techniques to use conventional UEs to report detected cells for the purpose of configuring appropriate identifiers (e.g. PCI) for newly-deployed cells, and for determining the identity of neighbouring cells (referred to as Automatic Neighbour Relations, ANR). Reports for SON and ANR are similar to those for MDT in that their primary purpose is to provide network related information for the benefit of the network operator and do not relate to the immediate operation (e.g. handover, cell reselection, etc.) of the particular UE generating the report. The term "MDT report" will be used herein to refer to any such report. Similarly, "MDT configuration" will be used to refer to a configuration for generating and/or transmitting such reports, irrespective of whether the report is for the purposes of SON, ANR or MDT.

As described above, a conventional MDT scheme re-uses measurement techniques and approaches that are used for either handover-related procedures or cell selection/reselection procedures.

As such, cells which a communications device is not permitted to access may be excluded from MDT measurements and/or reporting.

This may result in the network operator obtaining, using MDT, an incomplete survey of its network, because a UE excludes from MDT reports a cell or cells which it cannot access. However, these cells may have a significant effect on the performance of a network, for example because they cause high levels of interference in other cells. In addition or alternatively, the population of UEs which are permitted to access certain cells may be very small, may not support MDT, and/or may be stationary. Accordingly, it may not be possible for an operator to obtain a comprehensive understanding of the coverage provided by certain cells if it relies on MDT reporting from UEs which are permitted to access those cells.

Embodiments can provide a method of operating a communications device in a wireless communications network, the method comprising measuring received signals transmitted in a first cell at a first location to generate a measurement result, wherein the communications device is not permitted to access the first cell, and transmitting in a second cell a minimization of drive tests (MDT) report based on the measurement result, the report comprising an indication of the first location.

According to example embodiments, an operator of a network can obtain more complete and accurate reports of the coverage and transmissions of all cells in their network, without being limited to reports received from communications devices which relate only to those cells to which the communications devices are permitted to access.

In embodiments of the present technique, the communications device 270 is prohibited from accessing one or more first cells, for example because the cells are NPN cells and the communications device is not configured with permission to access the cells. The communications device 270 is, however, configured to perform measurements of signals transmitted in the first cells while being served by a second (permitted) cell of a wireless communications network, and to report the results of the measurements to the wireless communications network together with, in some embodiments, location information. The report may be used by the wireless communications network operator to inform adjustments to the operation of one or more of the first cells, the second cells, and a communications device (which may be the same as the communications device performing the reporting). The adjustments may be automatically made in response to receiving the measurement results.

Figure 5:
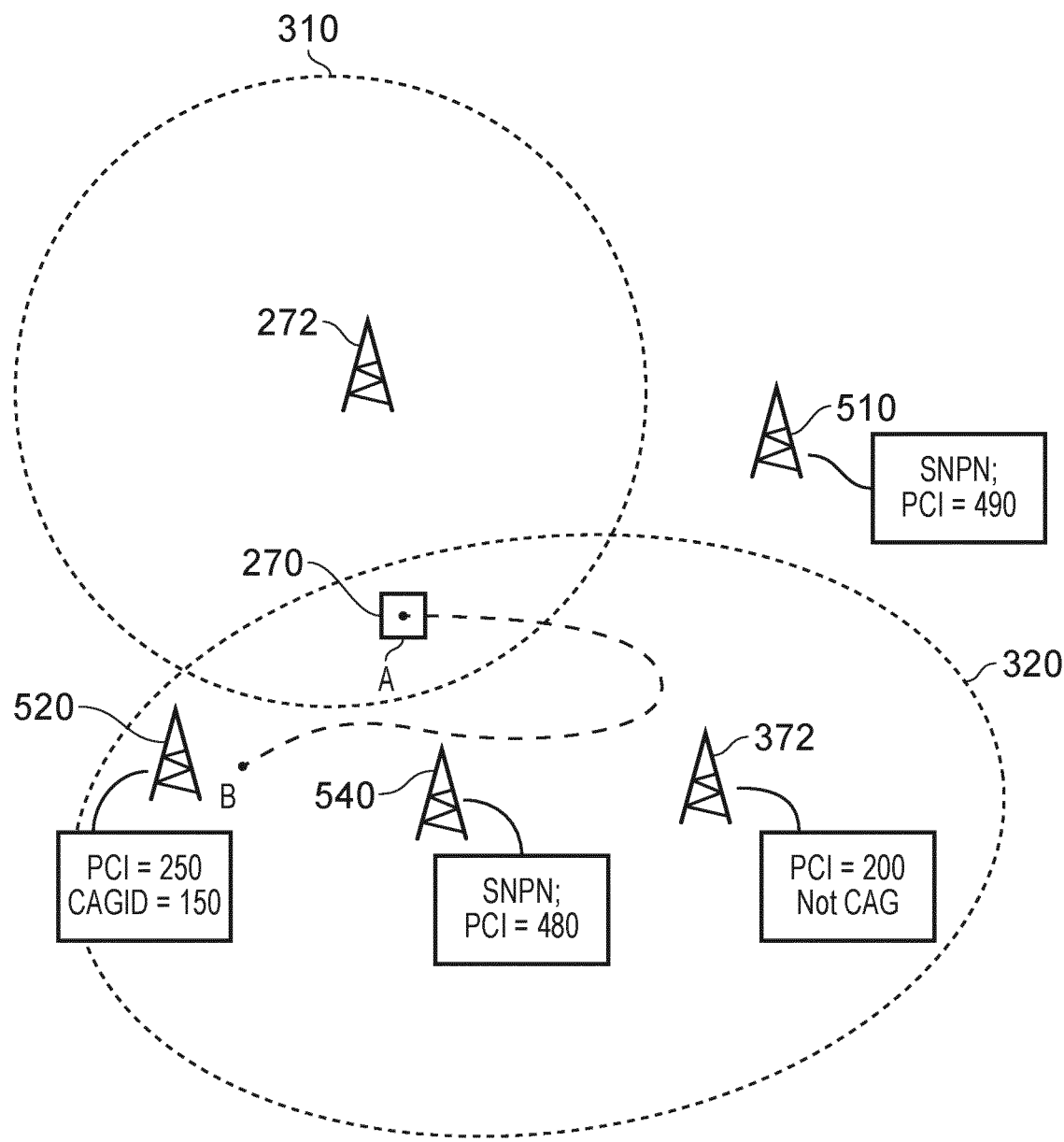
FIG. 5 shows a representation of an arrangement of infrastructure equipment and a communications device to illustrate embodiments of the present technique.

Example embodiments of the present technique will now be described by means of an example scenario. FIG. 5 shows a representation of an arrangement of infrastructure equipment and a communications device to illustrate embodiments of the present technique.

FIG. 5 shows the communications device 270 of FIG. 3 initially at point 'A' within the first cell 310 controlled by the first infrastructure equipment 272. In the example of FIG. 5, the communications device 270 follows the path from A to B along the dashed line 530, and subsequently returns to A. While following this path, the communications device 270 is served by (i.e. has selected as its serving cell) either the first cell 310 or the second cell 320 which is controlled by the second infrastructure equipment 372.

Third, fourth and fifth infrastructure equipment 510, 540 and 520 are in the vicinity of the first and second cells 310, 320 and control cells (not shown in FIG. 5) which the communications device 270 is not permitted to access.

Each of the infrastructure equipment transmits signals encoding identity parameters and, in some cases, whether the cell is a CAG cell and/or whether the cell is part of an SNPN part.

Figure 6:
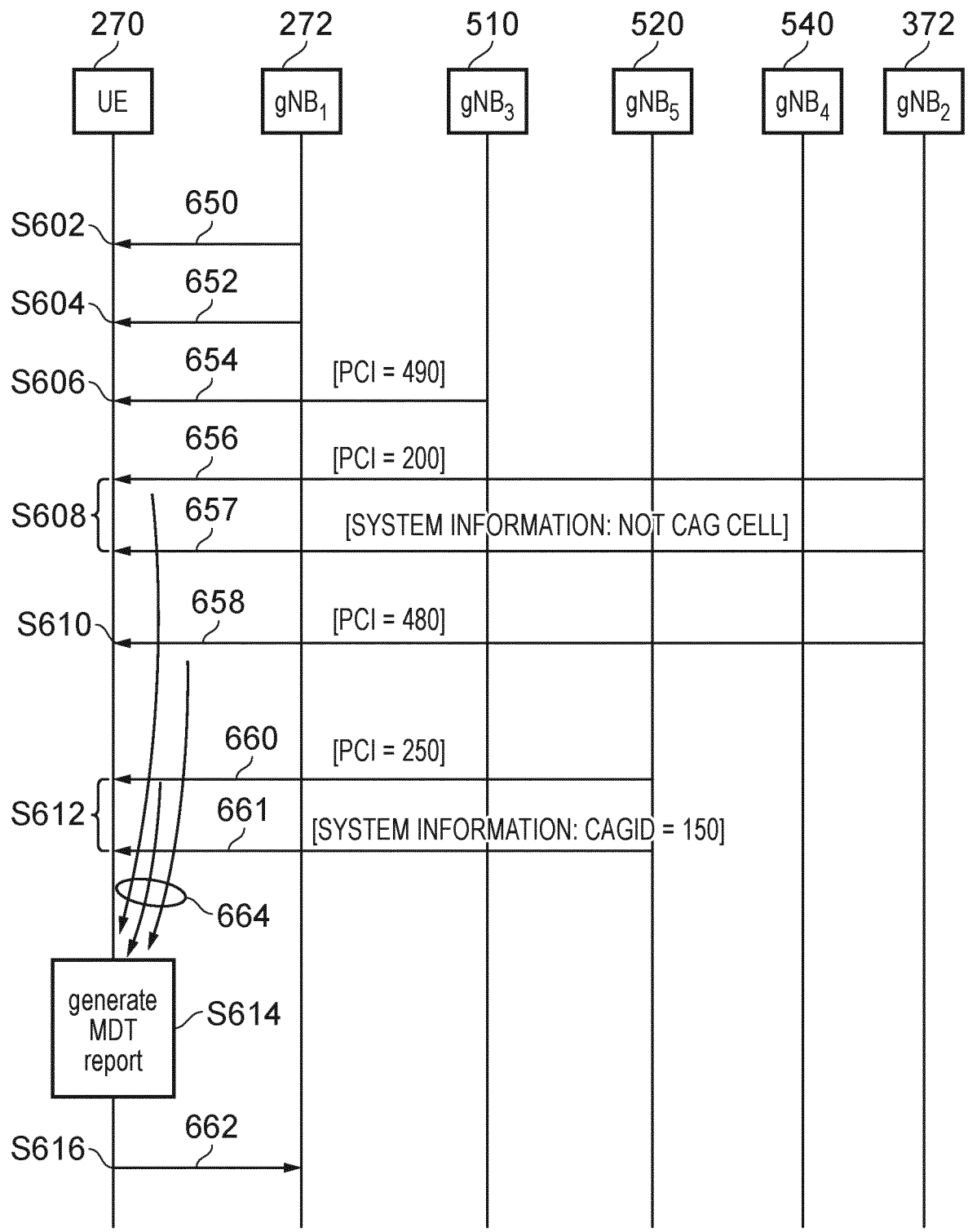
FIG. 6 is a message sequence chart/process diagram illustrating the transmission of an MDT report in accordance with embodiments of the present technique, in the example arrangement illustrated in FIG. 5.

FIG. 6 is a message sequence chart/process diagram illustrating the transmission of an MDT report in accordance with embodiments of the present technique, in the example arrangement illustrated in FIG. 5.

In FIG. 6, the communications device 270 is initially in a connected mode in the first cell 310 which is controlled by the first infrastructure equipment 272.

At step S602, the first infrastructure equipment 272 transmits a blacklist configuration indication 650 to the communications device 270. The blacklist configuration indication 650 comprises an indication of one or more identifiers which are associated with cells which the communications device 270 is not permitted to access. The term access in this sense can for example mean that the communications device is not permitted to reselect to, to change its serving cell, when for example in idle mode. Thus the communications device can measure signals received from the cell, but it is not permitted to select this cell or inform the network that this cell is to be used to transmit signals to the communications device 270 for example by paging the communications device or that the communications device 270 is for example permitted to transmit signals to infrastructure equipment forming the cell, such as during a random access procedure. The blacklist configuration indication 650 may comprise an indication of why the communications device 270 is not permitted to access the indicated cells.

In other examples, the communications device 270 does not receive signals from a blacklisted cell and therefore does not perform measurements for a blacklisted cell.

Figure 7:
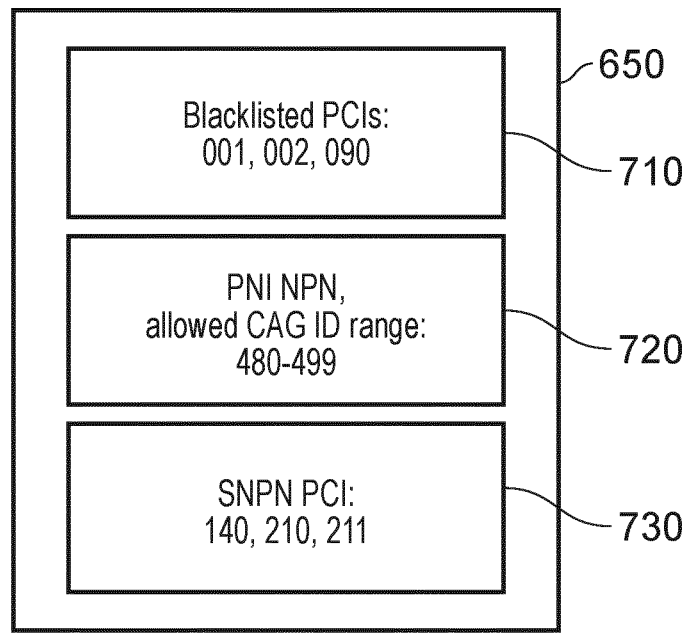
FIG. 7 illustrates an example blacklist configuration indication in accordance with embodiments of the present technique.

FIG. 7 illustrates an example blacklist configuration indication 650. In the example of FIG. 7, the blacklist configuration indication 650 comprises a blacklisted PCIs indication 710, a range of allowed CAG IDs indication 720, and an indication of one or more SNPN PCI values 730. In some embodiments one or more of the blacklisted PCIs indication 710, the range of allowed CAG IDs indication 720, and the indication of one or more SNPN PCI values 730 may be absent.

The blacklisted PCIs indication 710 indicates PCIs which are used by cells which are blacklisted (i.e. are forbidden for the communications device 270 for some reason which is not further specified).

The allowed CAG IDs indication 720 indicates PNI NPN CAG IDs associated with cells which are part of a PNI NPN and which the communications device 270 is permitted to access. In some embodiments (as in this example), the allowed CAG IDs indication 720 indicates implicitly that cells which are part of a PNI NPN and which have a CAG ID which is not listed in the allowed CAG IDs indication 720 are not accessible to the communications device 270.

The indication of the one or more SNPN PCI values 720 identify PCIs which are reserved for SNPN cells. In the example of FIG. 5, FIG. 6 and FIG. 7, the communications device 270 is not configured to be allowed to access any SNPN cells. Accordingly, based on the SNPN PCIs 730, the communications device 270 determines that it is not permitted to access any cell with a PCI indicated by the one or more SNPN PCI values 720.

Returning to FIG. 6, at step S604, the first infrastructure equipment 272 transmits to the communications device 270 an MDT configuration indication 652. The MDT configuration indication 652 indicates that the communications device 270 is permitted, and in some embodiments, required, to carry out MDT reporting in respect of one or more cells which the communications device 270 is not permitted to access.

The MDT configuration indication 652 may comprise one or more indications that one or more of the following are to be ignored when determining which cells are to be subject to MDT reporting:
all cell access restrictions;
cell access restrictions associated with CAG cells (e.g. PNI NPN cells);
cell access restrictions associated with SNPN cells; and
cell access restrictions associated with blacklisted cells.

The MDT configuration indication 652 may additionally or alternatively explicitly indicate one or more identities associated with cells which are to be reported by means of MDT reports, irrespective of any cell access restriction(s) applicable to those cells.

Figure 8:
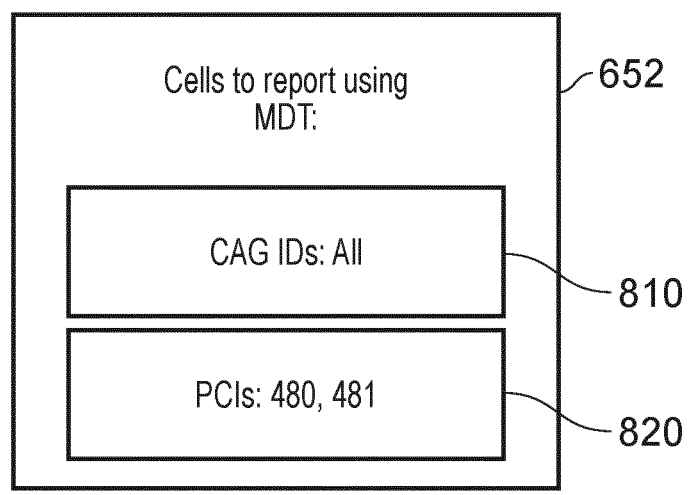
FIG. 8 illustrates an example MDT configuration indication in accordance with embodiments of the present technique.

The MDT configuration indication 652 in the example of FIG. 6 is shown in FIG. 8. As shown in FIG. 8, the MDT configuration indication 652 comprises a MDT CAG indication 810 that cell access restrictions associated with CAG cells are to be ignored, such that no restriction on MDT reporting applies to cells which transmit a CAG ID.

The MDT configuration indication 652 also comprises a MDT PCI indication 820 of PCIs 480 and 481, indicating that cells having these PCI values are not to be excluded from MDT reports. As described above, in this example, PCIs 480 and 481 fall within the range associated with SNPN cells, which the communications device 270 is not permitted to access. The MDT configuration indication 652 thus indicates that certain SNPN cells are to be subject to MDT reporting, even though the communications device 270 is not permitted to access them.

In some embodiments, the communications device 270 is pre-configured (e.g. based on standardised rules or requirements) with rules indicating a set of cells which it is not allowed to access. For example, the communications device may be prohibited from accessing any NPN cell if the communications device 270 is not capable of operating in any NPN cell. As a further example, additionally or alternatively, one or more PCI values may be preconfigured as being associated with either blacklisted cells, SNPN cells, or NPN cells, which the communications device is not permitted to access. In some embodiments, the communications device 270 may combine information derived from the blacklist configuration indication 650 with restrictions arising from the pre-configured rules. In some embodiments, step S602 may be omitted entirely.

In some embodiments, the communications device 270 is pre-configured (e.g. based on standardised rules or requirements) to carry out MDT reporting in respect of certain (or all) categories of cells which it is not permitted to access. In some such embodiments, therefore, the communications device 270 may carry out MDT reporting in respect of certain (or all) categories of cells which it is not permitted to access even if no MDT configuration indication 652 is received. Accordingly, in some embodiments, communications device 270 may combine information derived from the MDT configuration indication 652 with the pre-configuration in respect of MDT reporting of cell which it is not permitted to access. In some embodiments, step S604 may be omitted entirely.

The blacklist configuration indication 650 and MDT configuration indication 652 may be broadcast or transmitted using point-to-point transmissions (e.g. using RRC reconfiguration) and may in some embodiments be combined in a single message. In some embodiments, the blacklist configuration indication 650 and/or MDT configuration indication 652 may be received while the communications device is in connected mode.

Either or both of the blacklist configuration indication 650 and/or MDT configuration indication 652 (or the indications within them) may indicate one or more frequencies to which the respective indication applies. For example, the blacklisted PCIs indication 710 may comprise (or be associated with) a particular frequency, such that a cell with one of the indicated PCIs is not allowed (based on the blacklisted PCIs indication 710) only if the cell operates at the associated/ indicated frequency.

In some embodiments, the MDT configuration indication 652 (or an indication within it) may indicate that cells which operate on a frequency which the communications device 270 is not configured to measure for the purposes of cell reselection (if in idle mode) or conventional measurement reporting (if in connected mode). Accordingly, the communications device 270 may, in some embodiments carry out measurements for the purpose of MDT reporting, based on the MDT configuration indication 652, on frequencies in which all cells may be not allowed for handover and/or reselection. Such embodiments may permit an operator to configure one or more communications devices for performing MDT in respect of other networks which they operate, in particular, cells associated with a different public land mobile network (PLMN) identity from the PLMN ID of the PLMN to which the communications device is currently registered.

The blacklist configuration indication 650 shown in FIG. 7 is an example of an indication of one or more PCIs associated with cells which the communications device is not permitted to access, and an indication of one or more CAG IDs associated with cells which the communications device is permitted to access.

Returning to the sequence shown in FIG. 6, after receiving the MDT configuration indication 652 at step S602, then the communications device 270 proceeds from point A shown in FIG. 5 to point B, and returns to point A, following the path indicated by the dashed line 530. During this time, at steps S606, S608, S610 and S612, the communications device 270 receives signals 654, 656, 658 and 660, respectively, from infrastructure equipment 510, 520, 540 and 372 respectively.

It is assumed in the example of FIG. 6 that any measurement-related criteria (e.g. signal strength, signal quality, as explained further below) applicable to these signals for the purposes of MDT reporting are satisfied. Accordingly, the communications device 270 decodes the signals to determine whether the corresponding cells are candidates for MDT reporting.

As described above, the extent of decoding required may differ, depending on the type of identity information required to make the determination. For example, the third infrastructure equipment 510 transmits signals 654 encoding a PCI of 490.

In the example of FIG. 6, the communications device 270 determines that the cell in which the signals 654 are transmitted is an SNPN cell based on the PCI value encoded in the signals 654 being a PCI within the one or more SNPN PCI values 720. In the example of FIG. 6, the PCI of signals 654 is shown as being 490, which in the example of FIG. 6 is indicated as an SNPN PCI value in the blacklist configuration indication 650. Furthermore, based on the MDT PCI indication 820, the communications device 270 determines that the PCI value 490 corresponds to a cell that is to be excluded from MDT reporting. In response, the communications device 270 does not include in a subsequent MDT report 662 an indication based on measurements of the signals 654 transmitted by the third infrastructure equipment 510. The communications device 270 does not therefore need to decode signals carrying system information associated with the cell in which the signals 654 are transmitted.

The second infrastructure equipment 372 transmits signals 656 encoding a PCI of 200. Based on the blacklist configuration indication 650, the communications device 270 cannot determine whether or not it is permitted to generate an MDT report comprising an indication based on measurements of the signals 656. Thus, the communications device 270 decodes further signals 657 transmitted in the same cell encoding system information, which indicates that the cell is not a CAG cell.

In response, the communications device 270 determines, based on the signals 656, 657, that the communications device 270 is permitted both to access the cell controlled by the second infrastructure equipment 372, and to report the cell using the subsequent MDT report 662.

The fourth infrastructure equipment 540 transmits signals 658 encoding a PCI of 480. In the example of FIG. 6, the blacklist configuration indication 650 indicates that signals encoding a PCI value of 480 are not accessible to the UE, for example because the cell is an SNPN cell or for other (e.g. unspecified) reasons. Based on the blacklist configuration indication 650, the communications device 270 determines that the signals 658 are transmitted in a cell which it is not permitted to access (e.g. because the cell is an SNPN cell and the communications device 270 is configured to be not allowed to access any SNPN cells). However, based on the MDT PCI indication 820 within the MDT configuration indication 652, the communications device 270 determines that the PCI value 480 corresponds to a cell that is not to be excluded from MDT reporting. In response, the communications device 270 may include in the subsequent MDT report 662 an indication based on measurements of the signals 658 transmitted by the fourth infrastructure equipment 540.

The fifth infrastructure equipment 520 transmits signals 660 encoding a PCI of 250. Similarly to the signals 656 transmitted by the second infrastructure equipment 372, the communications device 270 cannot determine whether or not it is permitted to generate an MDT report comprising an indication based on measurements of the signals 660. Thus, the communications device 270 decodes further signals 661 transmitted in the same cell encoding system information, which indicates that the cell is a CAG cell and has a CAG ID of 150.

In response, based on the allowed CAG IDs indication 720 or otherwise, the communications device 270 determines that it is not permitted to access this cell. In this example, the allowed CAG IDs indication 720 provides an exhaustive list of those CAG IDs associated with CAG cells which the communications device 270 is permitted to access and thus the determination is made directly based on the allowed CAG IDs indication 720. Based on the MDT CAG indication 810 which may, as in the example of FIG. 6, indicate that an MDT report may be generated in respect of any cell which is a CAG cell, the communications device 270 determines that it is permitted to generate an MDT report comprising an indication based on measurements of the signals 660, 661 transmitted by the fifth infrastructure equipment 520.

Subsequently, at step S614, the communications device 270 generates the MDT report 662. The MDT report 662 is based on measurements of signals received at steps S608, S610 and S612, as indicated by the arrows 664.

Preferably, the MDT report 662 comprises an indication of the respective locations at which the communications device 270 received and measured the signals at steps S608, S610 and S612.

At step S616, the communications device 270 transmits the MDT report 662 to the first infrastructure equipment 272.

Steps S606, S608, S610 and S612 may occur while the communications device 270 is in the connected mode, or when the communications device 270 is in an idle mode. Accordingly, the cells in which the signals 654, 656, 658 and 660 are transmitted may be evaluated for the purposes of cell reselection (if the communications device 270 is not in connected mode) or for measurement reporting for supporting a handover determination by the serving infrastructure equipment (if the communications device 270 is in connected mode).

If, prior to step S614, the communications device 270 is in an idle mode, then the communications device 270 may enter the connected mode (e.g. by establishing, or re-activating, an RRC connection in accordance with conventional techniques).

In the example of FIG. 6, the measurements occur over a time period, and the MDT report 662 is generated based on measurements, the results of which are stored at the communications device 270 for later transmission to an infrastructure equipment, such as the first infrastructure equipment 272. Accordingly, FIG. 6 illustrates an example of logged MDT in accordance with embodiments of the present technique.

However, it will be appreciated that the principles disclosed herein can be applied to immediate MDT reporting. For example, where the communications device 270 remains in connected mode and receives the signals 656, 658, 660 while in connected mode, in some embodiments the communications device 270 may generate and transmit an immediate MDT report in response to detecting and measuring the signals received in each of the respective cells. Thus, for example, the communications device 270 may immediately generate and transmit an MDT report in response to determining at step S608 that the communications device 270 is permitted to report, using an MDT report, the cell in which the signals 656, 657 are transmitted.

In some embodiments, an MDT report used for immediate MDT reporting comprises a conventional measurement report which is extended to accommodate the reports of cells for which MDT reporting is permitted but which the communications device 270 is not permitted to access.

In some embodiments, signal measurement-based restrictions on MDT which are unrelated to cell access restrictions may apply in addition to, and irrespective of, any restriction (or lack thereof) based on cell identity. For example, these signal measurement-based restrictions may comprise signal power thresholds and/or signal quality thresholds, such that an MDT report is only generated in respect of cells whose received signals satisfy (e.g. exceed) one or both of these thresholds. These restrictions may be based on restrictions which are applicable to the communications device 270 for measurement reporting (for network-controlled mobility) or cell reselection (for UE-controlled mobility).

For example, the restrictions may be (or correspond to) measurement reporting controls which are applicable for connected mode neighbour cell measurements, and may further or alternatively comprise event definitions, whereby MDT reporting is only triggered in response to certain 'event' criteria being satisfied.

In some embodiments, an MDT report may comprise for each reported cell, an indication of the identity of the cell. For example, an MDT report for a cell may comprise an indication of the PCI, and/or a CAG ID, and/or a NPN ID associated with the cell.

In some embodiments, identification of the cell may be omitted. For example, in some embodiments, the MDT report may comprise an indication of a number of detected cells which the communications device 270 determines are not accessible to the communications device 270 but which are permitted or are required to be the subject of an MDT report.

In some embodiments, the MDT report may comprise an indication that a cell was detected which has a PCI listed in a blacklist or CAG PCI list and/or an indication of a number of such cells which were higher ranked than the currently camped on cell. Alternatively or additionally, the communications device 270 may log or report how many such cells were encountered during a period.

Thus, in some embodiments, the communications device 270 does not log the cell identity of a detected cell, as it may give an indication of a present or previous location of the communications device 270. Instead, the communications device 270 simply indicate in an MDT report how many blacklisted or NPN cells, which it is not permitted to access, were encountered. As described above, the MDT report may be based on only cells which satisfy other signal measurement-related criteria, such as those used to specify events and/or reselection criteria.

Such embodiments may provide enhanced privacy protection by avoiding revealing to the communications network exact location information or RF fingerprint information associated with the location of the communications device 270.

It is customary for a mobile network operator to refrain from requesting a communications device to measure and report a coverage of a competing mobile operator. This restriction may be enforced by requiring the communications device to log/report blacklisted cells from a particular PLMN only, such as the RPLMN, and/or by requiring the communications device to log/report blacklisted cells which operate on a frequency associated with the RPLMN.

According to some embodiments of the present technique, the communications device 270 is configured (for example, by means of an indication within the MDT configuration indication 652) that it is required, or permitted, to include in MDT reports indications based on measurements of signals transmitted in a cell which belongs to another PLMN other than the registered PLMN. The other PLMN may be specified. The indication may be implicit, for example by identifying within the MDT configuration indication 652 one or more frequencies on which cells are to be measured for the purposes of MDT reporting, as described above.

In some embodiments, the MDT configuration indication 652 may comprise an indication that the communications device 270 is to report blacklisted cells from an allowed PLMN which is not the registered PLMN.

In some deployments, a single operator may deploy both a public network and an NPN, the public network and NPN having different PLMN IDs. Thus, embodiments of the present technique allow an operator to obtain information about coverage of both its public network and its NPN network from a single communications device. This may be particularly beneficial when communications devices which are permitted to access the NPN are poorly suited for MDT (for example, because they have limited battery capacity and/or limited mobility).

In some embodiments, such as illustrated in the example described above, the communications device 270 is permitted to access both a public network and one or more NPN cells.

However, the present disclosure is not so limited.

In some embodiments, one or more of the following may be applicable to the communications device:

- the communications device is not currently permitted to access any NPN cells (e.g. has no CAG allowed list, or has a CAG allowed list which does not include any CAG IDs associated with cells in its current location; the communications device may also not be configured to access any SNPN cells);
- the communications device is a 3GPP Release 16 or Release 17 (or later) communications device having no NPN functionality implemented. Such a communications device is a 'public UE' and may nevertheless encounter NPN cells, in particular when both NPN and public networks share the same frequency;
- the communications device has NPN capabilities, has a CAG allowed list and is currently being served in an NPN cell which it is permitted to access. There may be a neighbouring NPN network which the communications device is not allowed to access, and which may operate on the same frequency as the current serving cell.

In some embodiments, when the communications device 270 decodes a PCI from signals transmitted in a cell and the PCI does not allow the communications device 270 to determine whether it is permitted to report that cell using an MDT, the communications device 270 may subsequently decode further signals (such as those used for the transmission of system information) to determine further identity information and/or access restrictions of the cell.

Alternatively, in some embodiments, the communications device 270 may store an association between the PCI and one or more further parameters associated with the cell, on which the determination may be made. For example, the communications device 270 may decode system information indicating the CAG ID of a cell. The communications device 270 may store an association between the CAG ID and the PCI of the cell, and may subsequently use that stored association to determine whether or not it is permitted to report that cell using an MDT.

Such embodiments can avoid the need for the communications device 270 to repeatedly decode system information for cells.

It will be appreciated that the sequence of FIG. 6 may in some embodiments be different. For example, in some embodiments signals may be received from only one cell which the communications device is not permitted to access.

In FIG. 6, signals from which the PCI is decoded and signals from which system information is decoded are shown as separate signals. It will be appreciated that in some embodiments these signals may be the same. Furthermore, in some embodiments the signals which form the basis for measurement may be different from those used to establish identity parameters associated with a cell. In some embodiments, measurements are made multiple times in respect of signals transmitted in a cell.

Embodiments can therefore provide a method of operating a communications device in a wireless communications network, the method comprising: measuring received signals transmitted in a first cell at a first location to generate a measurement result, wherein the communications device is not permitted to access the first cell, and transmitting in a second cell a minimization of drive tests (MDT) report based on the measurement result, the report comprising an indication of the first location.

Corresponding infrastructure equipment, and communications devices and circuitry, and computer readable media are also provided by embodiments of the present disclosure.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communications devices/IoT devices or other narrowband communications devices, but can be applied more generally, for example in respect of any type communications device operating with a wireless link to the communication network.

It will further be appreciated that the principles described herein are not applicable only to NR-based wireless telecommunications systems, but may be applicable for any type of wireless telecommunications system having cells to which access is restricted.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a communications device in a wireless communications network, the method comprising: measuring received signals transmitted in a first cell at a first location to generate a measurement result, wherein the communications device is not permitted to access the first cell, and transmitting in a second cell a minimization of drive tests (MDT) report based on the measurement result, the report comprising an indication of the first location.

Paragraph 2. A method according to paragraph 1, the method comprising: decoding from signals transmitted in the first cell a first physical cell identity (PCI) associated with the first cell, and determining, based on the first physical cell identity, that the communications device is not permitted to access the first cell.

Paragraph 3. A method according to paragraph 2, wherein the first PCI is associated with a standalone non-public network cell.

Paragraph 4. A method according to paragraph 2 or paragraph 3, the method comprising: receiving a first indication of one or more PCIs associated with cells which the communications device is not permitted to access, wherein the one or more PCIs comprise the first PCI, wherein the determining that the communications device is not permitted to access the first cell is further based on the first indication.

Paragraph 5. A method according to paragraph 4, wherein the first indication comprises an indication that the one or more PCIs are associated with cells which are part of a standalone non-public network.

Paragraph 6. A method according any of paragraphs 1 to 5, the method comprising: decoding, from signals transmitted in the first cell, system information associated with the first cell, the system information comprising an indication of one or more cells to which access is prohibited to a group of one or more communications devices, and determining, based on the indication of one or more cells to which access is prohibited, that the communications device is not permitted to access the first cell.

Paragraph 7. A method according to paragraph 6, the method comprising: receiving a second indication of one or more cells which the communications device is permitted to access, wherein the one or more cells provided by the second indication do not comprise the indication of the one or more cells to which access is prohibited, wherein the determining that the communications device is not permitted to access the first cell is further based on the second indication.

Paragraph 8. A method of paragraph 6 or 7, wherein the indication of the one or more cells to which access is prohibited includes an indication of a first closed access group, CAG, identity, ID.

Paragraph 9. A method of paragraph 6 or 7, wherein the indication of the one or more cells to which access is prohibited includes an indication of one or more standalone non-public networks, SNPN, identifiers.

Paragraph 10. A method according to any of paragraphs 1 to 9, the method comprising: receiving an MDT configuration indication, the MDT configuration indication comprising an indication that the communications device is permitted to generate the minimization of drive tests (MDT) report based on the measurement result.

Paragraph 11. A method according to paragraph 10, wherein the MDT configuration indication comprises an indication that the communications device is required to generate the minimization of drive tests (MDT) report based on the measurement result.

Paragraph 12. A method according to any of paragraphs 1 to 11, wherein when measuring the received signals transmitted in the first cell and transmitting the minimization of drive tests (MDT) report, the communications device is in a connected mode in the second cell.

Paragraph 13. A method according to any of paragraphs 1 to 9, wherein when measuring the received signals transmitted in the first cell, the communications device is in an idle mode, and when transmitting the minimization of drive tests (MDT) report, the communications device is in a connected mode in the second cell.

Paragraph 14. A method according to paragraph 11, wherein transmitting the minimization of drive tests (MDT) report is in response to the communications device entering the connected mode in the second cell.

Paragraph 15. A method according to any of paragraphs 1 to 12, wherein the second cell is associated with a first mobile network identity, and the first cell is associated with a second mobile network identity different from the first mobile network identity.

Paragraph 16. A method according to paragraph 13, wherein the first mobile network identity and the second mobile network identity are public land mobile network (PLMN) identities.

Paragraph 17. A method according to any of paragraphs 1 to 14, the method comprising: determining that the measurement result satisfies predetermined criteria, wherein transmitting the minimization of drive tests (MDT) report is in response to determining that the measurement result satisfies the predetermined criteria.

Paragraph 18. A method according to paragraph 15, wherein the predetermined criteria comprise one or more of a minimum received signal strength criterion and a minimum signal quality criterion.

Paragraph 19. A method according to paragraph 15 or paragraph 16, the method comprising receiving an indication of the predetermined criteria.

Paragraph 20. A method of operating an infrastructure equipment in a wireless communications network, the method comprising receiving in a second cell a minimization of drive tests (MDT) report transmitted by a communications device, the MDT report based on a measurement result and comprising an indication of a location, wherein the measurement result is generated by the communications device by measuring, at the location, received signals transmitted in a first cell which communications device is not permitted to access.

Paragraph 21. A method according to paragraph 20, the method comprising: transmitting a first indication of one or more PCIs associated with cells which the communications device is not permitted to access, wherein the first cell is associated with one of the one or more PCIs.

Paragraph 22. A method according to paragraph 18 or paragraph 19, the method comprising: transmitting a second indication of one or more CAG IDs associated with cells which the communications device is permitted to access, wherein the first cell is not associated with any of the one or more CAG IDs.

Paragraph 23. A method according to any of paragraphs 18 to 20, the method comprising: transmitting an MDT configuration indication comprising an indication that the communications device is permitted to generate the minimization of drive tests (MDT) report based on the measurement result.

Paragraph 24. A method according to any of paragraphs 18 to 21, the method comprising: in response to receiving the MDT report, adjusting a configuration of one or more of the first cell, the second cell, the communications device and another communications device.

Paragraph 25. A method according to any of paragraphs 1 to 24, wherein the first cell is a 5G/new radio (NR) cell.

Paragraph 26. A communications device for operating in a wireless communications network, the communications device comprising a transmitter configured to transmit signals via a wireless access interface provided by an infrastructure equipment of the wireless communications network, a receiver configured to receive signals via the wireless access interface, and a controller configured to control the transmitter and the receiver so that the communications device is operable: to measure received signals transmitted in a first cell at a first location to generate a measurement result, wherein the communications device is not permitted to access the first cell, and to transmit in a second cell a minimization of drive tests (MDT) report based on the measurement result, the report comprising an indication of the first location.

Paragraph 27. Circuitry for a communications device for operating in a wireless communications network, the communications device comprising transmitter circuitry configured to transmit signals via a wireless access interface provided by an infrastructure equipment of the wireless communications network, receiver circuitry configured to receive signals via the wireless access interface, and controller circuitry configured to control the transmitter circuitry and the receiver circuitry so that the communications device is operable: to measure received signals transmitted in a first cell at a first location to generate a measurement result, wherein the communications device is not permitted to access the first cell, and to transmit in a second cell a minimization of drive tests (MDT) report based on the measurement result, the report comprising an indication of the first location.

Paragraph 28. Infrastructure equipment for use in a wireless communications network, the wireless communications network, the infrastructure equipment providing a wireless access interface for communicating with a communications device in a second cell, the infrastructure equipment comprising a transmitter configured to transmit signals to the communications device via the wireless access interface in the second cell, a receiver configured to receive signals from the communications device, and a controller configured to control the transmitter and the receiver so that the infrastructure equipment is operable to receive in the second cell a minimization of drive tests (MDT) report transmitted by a communications device, the MDT report based on a measurement result and comprising an indication of a location, wherein the measurement result is generated by the communications device by measuring, at the location, received signals transmitted in a first cell which communications device is not permitted to access.

Paragraph 29. Circuitry for infrastructure equipment for use in a wireless communications network, the wireless communications network, the infrastructure equipment providing a wireless access interface for communicating with a communications device in a second cell, the circuitry comprising transmitter circuitry configured to transmit signals to the communications device via the wireless access interface in the second cell, receiver circuitry configured to receive signals from the communications device, and controller circuitry configured to control the transmitter and the receiver so that the infrastructure equipment is operable to receive in the second cell a minimization of drive tests (MDT) report transmitted by a communications device, the MDT report based on a measurement result and comprising an indication of a location, wherein the measurement result is generated by the communications device by measuring, at the location, received signals transmitted in a first cell which communications device is not permitted to access.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," RAN #81.
[2] Holma H. and Toskala A, "LTE for UMTS OFDMA and SC-FDMA based radio access", John Wiley and Sons, 2009
[3] 3GPP TS 23.501 "System architecture for the 5G System (5GS)", Release 16
[4] 3GPP TS 38.300
[5] 3GPP TS 38.304

The invention claimed is:

1. A method of operating a communications device in a wireless communications network, the method comprising:
measuring received signals transmitted in a first cell at a first location to generate a measurement result while the communications device is served by a second cell, wherein the communications device is not permitted to access the first cell, and
transmitting in the second cell a minimization of drive tests (MDT) report based on the measurement result, the report comprising an indication of the first location,
wherein the communications device measures the received signals from the first cell in response to an MDT configuration indicating that the communications device can ignore one or more restrictions pertaining to the first cell.

2. The method according to claim 1, comprising:
decoding from signals transmitted in the first cell a first physical cell identity (PCI) associated with the first cell, and
determining, based on the first physical cell identity, that the communications device is not permitted to access the first cell.

3. The method according to claim 2, wherein the first PCI is associated with a standalone non-public network cell.

4. The method according to claim 2, comprising:
receiving a first indication of one or more PCIs associated with cells which the communications device is not permitted to access, wherein the one or more PCIs comprise the first PCI, wherein
the determining that the communications device is not permitted to access the first cell is further based on the first indication.

5. The method according to claim 4, wherein the first indication comprises an indication that the one or more PCIs are associated with cells which are part of a standalone non-public network.

6. The method according claim 1, comprising:
decoding, from signals transmitted in the first cell, system information associated with the first cell, the system information comprising an indication of one or more cells to which access is prohibited to a group of one or more communications devices, and
determining, based on the indication of one or more cells to which access is prohibited, that the communications device is not permitted to access the first cell.

7. The method according to claim 6, comprising:
receiving a second indication of one or more cells which the communications device is permitted to access, wherein the one or more cells provided by the second indication do not comprise the indication of the one or more cells to which access is prohibited, wherein
the determining that the communications device is not permitted to access the first cell is further based on the second indication.

8. The method according to claim 6, wherein the indication of the one or more cells to which access is prohibited includes an indication of a first closed access group (CAG) identity (ID).

9. The method according to claim 6, wherein the indication of the one or more cells to which access is prohibited includes an indication of one or more standalone non-public networks (SNPN) identifiers.

10. The method according to claim 1, comprising:
receiving an MDT configuration indication, the MDT configuration indication comprising an indication that the communications device is permitted to generate the minimization of drive tests (MDT) report based on the measurement result.

11. The method according to claim 10, wherein the MDT configuration indication comprises an indication that the communications device is required to generate the minimization of drive tests (MDT) report based on the measurement result.

12. The method according to claim 1, wherein when measuring the received signals transmitted in the first cell and transmitting the minimization of drive tests (MDT) report, the communications device is in a connected mode in the second cell.

13. The method according to claim 1, wherein when measuring the received signals transmitted in the first cell, the communications device is in an idle mode, and
when transmitting the minimization of drive tests (MDT) report, the communications device is in a connected mode in the second cell.

14. The method according to claim 13, wherein transmitting the minimization of drive tests (MDT) report is in response to the communications device entering the connected mode in the second cell.

15. The method according to claim 1, wherein the second cell is associated with a first mobile network identity, and the first cell is associated with a second mobile network identity different from the first mobile network identity.

16. The method according to claim 15, wherein the first mobile network identity and the second mobile network identity are public land mobile network (PLMN) identities.

17. The method according to claim 1, comprising:
  determining that the measurement result satisfies predetermined criteria, wherein
  transmitting the minimization of drive tests (MDT) report is in response to determining that the measurement result satisfies the predetermined criteria.

18. The method according to claim 17, wherein the predetermined criteria comprise one or more of a minimum received signal strength criterion and a minimum signal quality criterion.

19. A communications device for operating in a wireless communications network, the communications device comprising:
  a transmitter configured to transmit signals via a wireless access interface provided by an infrastructure equipment of the wireless communications network,
  a receiver configured to receive signals via the wireless access interface, and
  a controller configured to control the transmitter and the receiver so that the communications device is operable:
    to measure received signals transmitted in a first cell at a first location to generate a measurement result while the communications device is served by a second cell, wherein the communications device is not permitted to access the first cell, and
    to transmit in the second cell a minimization of drive tests (MDT) report based on the measurement result, the report comprising an indication of the first location,
  wherein the controller of the communications device measures the received signals from the first cell in response to an MDT configuration indicating that the communications device can ignore one or more restrictions pertaining to the first cell.

20. Infrastructure equipment for use in a wireless communications network, the wireless communications network, the infrastructure equipment providing a wireless access interface for communicating with a communications device in a second cell, the infrastructure equipment comprising:
  a transmitter configured to transmit signals to the communications device via the wireless access interface in the second cell,
  a receiver configured to receive signals from the communications device, and
  a controller configured to control the transmitter and the receiver so that the infrastructure equipment is operable to receive in the second cell a minimization of drive tests (MDT) report transmitted by a communications device, the MDT report based on a measurement result and comprising an indication of a location,
  wherein the measurement result is generated by the communications device by measuring, at the location, received signals transmitted in a first cell which communications device is not permitted to access while the communications device is served by the second cell, and
  the communications device measures the received signals from the first cell in response to an MDT configuration indicating that the communications device can ignore one or more restrictions pertaining to the first cell.

\* \* \* \* \*